United States Patent
Sablin et al.

(10) Patent No.: US 11,445,223 B2
(45) Date of Patent: Sep. 13, 2022

(54) LOSS DETECTION FOR ENCODED VIDEO TRANSMISSION

(71) Applicant: Microsoft Technology Licensing, LLC, Redmond, WA (US)

(72) Inventors: Sergey Sablin, Redmond, WA (US); Adriana Dumitras, Sunnyvale, CA (US); Gary J. Sullivan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1417 days.

(21) Appl. No.: 15/377,620

(22) Filed: Dec. 13, 2016

(65) Prior Publication Data

US 2018/0077421 A1 Mar. 15, 2018

Related U.S. Application Data

(60) Provisional application No. 62/385,694, filed on Sep. 9, 2016.

(51) Int. Cl.
*H04N 19/44* (2014.01)
*H04N 19/895* (2014.01)
*H04N 19/503* (2014.01)

(52) U.S. Cl.
CPC ......... *H04N 19/895* (2014.11); *H04N 19/503* (2014.11)

(58) Field of Classification Search
CPC ........................... H04N 19/895; H04N 19/503
See application file for complete search history.

(56) References Cited

U.S. PATENT DOCUMENTS

| 6,201,834 | B1 | 3/2001 | Zhu |
| 8,249,170 | B2 | 8/2012 | Chen et al. |
| 9,609,341 | B1* | 3/2017 | Gu .......................... H04N 19/46 |
| 2006/0029367 | A1 | 2/2006 | Kosugi et al. |

(Continued)

FOREIGN PATENT DOCUMENTS

| WO | 2013126284 A2 | 8/2013 |
| WO | 2013184487 A2 | 12/2013 |
| WO | 2015035232 A2 | 3/2015 |

OTHER PUBLICATIONS

VP9 Bitstream superframe and uncompressed header Draft 29 pages (Year: 2015).*

(Continued)

*Primary Examiner* — William C Vaughn, Jr.
*Assistant Examiner* — Naod W Belai
(74) *Attorney, Agent, or Firm* — NovoTechIP International PLLC

(57) ABSTRACT

Video data is received at a decoding device. An encoded first frame of the video data is received with a current frame description for the first frame comprising: an identifier of the first frame, and an indicator of a storage location at the receiving device for the first frame and its frame identifier. An encoded second frame of the video data is also received with at least one reference frame description for the second frame comprising: a reference frame identifier, and an indicator of said storage location. This allows the decoding device to check that the correct reference frame for decoding the second frame is stored thereat. Corresponding encoding operations are also disclosed.

20 Claims, 6 Drawing Sheets

(56) References Cited

U.S. PATENT DOCUMENTS

| | | | |
|---|---|---|---|
| 2013/0094585 A1* | 4/2013 | Misra | H04N 19/503 375/240.16 |
| 2013/0120531 A1 | 5/2013 | Sato | |
| 2013/0215975 A1* | 8/2013 | Samuelsson | H04N 19/70 375/240.25 |
| 2014/0079368 A1 | 3/2014 | Sasaki et al. | |
| 2014/0092997 A1* | 4/2014 | Zhou | H04N 19/44 375/240.27 |
| 2014/0294063 A1* | 10/2014 | Chen | H04N 19/105 375/240.02 |
| 2015/0172689 A1 | 6/2015 | Annamraju et al. | |
| 2017/0272773 A1* | 9/2017 | Liu | H04N 19/105 |

OTHER PUBLICATIONS

Akramullah, Shahriar, "Video Coding Standards", In Publication of Apress, Oct. 27, 2014, pp. 55-100.

"MPEG Headers Quick Reference", Retrieved on: Sep. 7, 2016 Available at: http://dvd.sourceforge.net/dvdinfo/mpeghdrs.html.

Sjöberg, et al., "Overview of HEVC High-Level Syntax and Reference Picture Management", In Journal of IEEE Transactions on Circuits and Systems for Video Technology, vol. 22, Issue 12, Dec. 2012, pp. 1858-1870.

Gharai, et al., "RTP Payload Format for Uncompressed Video", Published on: Sep. 2005 Available at: https://tools.ietf.org/html/rfc4175.

Wang, Ce , "gbeauchesne/libva", Published on: Apr. 2, 2015 Available at: https://github.com/gbeauchesne/libva/blob/master/va/va_dec_vp9.h.

"High Efficiency Video Coding", Published on: Apr. 2015 Available at: https://www.itu.int/rec/dologin_pub.asp?lang=e&id=T-REC-H.265-201504-I!!PDF-E&type=items.

"Advanced Video Coding for Generic Audiovisual Services", Published on: Feb. 3, 2016 Available at: https://www.itu.int/rec/T-REC-H.264.

Wenger, et al., "RTP Payload Format for Scalable Video Coding", Published on: May 2011 Available at: https://tools.ietf.org/html/rfc6190.

U.S. Appl. No. 14/847,375, Nikiforov, et al., "Video frame loss recovery in conferencing scenario", filed Sep. 8, 2005.

Grange, et al., "VP9 Bitstream and Decoding Process Specification", Published on: Mar. 31, 2016 Available at: https://storage.googleapis.com/downloads.webmproject.org/docs/vp9/vp9-bitstream-specification-v0.6-20160331-draft.pdf.

Uberti, et al., "RTP Payload Format for VP9 Video draft-ietf-payload-vp9-02", Published on: Mar. 18, 2016 Available at: https://tools.ietf.org/html/draft-ietf-payload-vp9-02.

* cited by examiner

LOSS DETECTION FOR ENCODED VIDEO TRANSMISSION

RELATED APPLICATIONS

This application claims priority under 35 U.S.C. Section 119(e) to U.S. Provisional Patent Application No. 62/385,694, filed Sep. 9, 2016 and titled "Loss Detection for Encoded Video Transmission," the entire disclosure of which is hereby incorporated by reference.

TECHNICAL FIELD

The present invention relates to the transmission and reception of encoded video frames with associated frame descriptions to assist in their decoding, and in particular to assist in the detection of lost frames (among other things).

BACKGROUND

A stream of video data to be encoded is illustrated schematically in FIG. 1. The stream comprises multiple frames (F) 101, 102, 103 each representing the video image at a different respective moment in time. As will be familiar to a person skilled in the art, for the purpose of encoding, each frame (F) 101, 102, 103 is divided into portions 104 and each portion may also be subdivided into smaller sub-portions, each portion or sub-portion comprising a plurality of pixels.

For example, according to the current VP9 encoding scheme, each frame is divided into tiles, which in turn are divided into 64×64 pixel superblocks. Each superblock has, in turn, a partition which specifies how it is to be decoded—as a single 64×64 block, or multiple smaller blocks. Smaller blocks can, in turn, be further divided to sub-blocks. Details can be found for example in the draft version of the VP9 Bitstream & Decoding Process Specification, version 0.6 (the "VP9 Specification").

A link to a draft version of the VP9 Specification was made available in August 2016 at http://www.webmproject.org/vp9/, which provides the following link to the underlying document: https://storage.googleapis.com/downloads.webmproject.org/docs/vp9/vp9-bitstream-specification-v0.6-20160331-draft.pdf.

Other specifications and standards define different schemes by which frames can be divided into blocks, and for the avoidance of doubt it is noted that the subject matter disclosed herein is not limited to any existing codec, coding format, standard or specification.

In a network streaming context, an encoder at a transmitting device (transmitter) may encode the video data for transmission to a receiving device (receiver) over a network, such as a packet-based network or even a circuit-switched network. A decoder at the receiver is then able to decode the encoded video data. Of course, there are other uses that do not involve packet-based networks. For example, coded video may be stored on a computer readable storage medium, disk such as a Blu-ray Disc, or an electronic (e.g. magnetic or solid-state) storage device etc. and then played back by a video player.

The general term for the encoding/decoding method employed is a codec.

A goal of a video codec is to reduce the bit rate needed to transmit a video signal, while maintaining highest possible quality. This goal is achieved by exploiting statistical redundancies (similarities in the video signal) and perceptual irrelevancies (related to sensitivity of human visual system). This is sometimes referred to as "compression".

Most of today's video codecs are based on an architecture that includes prediction of pixel blocks from other pixel blocks, transform of prediction residuals, quantization of transform coefficients, and entropy coding of quantization indices. These steps contribute to reducing redundancies and irrelevancies.

The prediction can typically be performed from pixels in video frames other than the current frame (inter prediction/inter-frame encoding) and from pixels in the same frame (intra prediction/intra-frame encoding). That is, an intra-coded frame (I-frame) is encoded using only information in that frame itself. For example, spatial redundancies across the frame image can be exploited using known techniques such as a discrete cosine transform and prediction from the values of pixels in neighboring regions.

An inter-encoded frame, on the other hand, is encoded using information from frames other than itself (reference frames). That is, an inter-encoded frame may only indicate the differences between the frame and one or more other encoded frames of the bit stream. Hence an inter-encoded frame typically requires fewer bits to encode than directly encoding pixel values without prediction and hence saves on bit rate.

Intra prediction encoding typically requires more bits than inter prediction, though it typically still represents a saving over directly encoding values without prediction. Some regions of an inter-coded frame may be encoded using intra prediction or the direct encoding of pixel values without prediction, but at least one region is encoded using inter-coding. Details of suitable inter and intra encoding techniques for video will be familiar to a person skilled in the art. Note that, whilst the terms non-I-frame and inter-frame are sometimes used synonymously, there can be subtle distinction in some contexts. This is discussed in further detail below.

A specific type of I-frame is an IDR-frame, where IDR stands for Instantaneous Decoder Refresh. An IDR-frame is an I-frame, wherein no frame later than the IDR-frame in the video stream uses any frame earlier in the bit stream than the IDR-frame as a reference frame. An IDR-frame therefore provides a "cut-off point" in the video stream, in the sense that it is guaranteed that no frame earlier than the IDR-frame in the video stream will ever be needed to decode any frame later than it. Although the IDR terminology can be traced to the H.264 standard, the principle is not limited to any particular standard. For the avoidance of doubt, the term IDR when used herein refers to a frame which provides a cut-off point in the stream in this sense and is not limited to any particular coding format.

Other types of frame, that is I-frames which are not IDR frames and inter-coded frames, are called non-IDR frames herein.

In addition to the video compression, the video encoding may comprise the generation of associated header data which is transmitted in association with the compressed frame data to the receiving device for use in decoding the received frames.

For example, with reference to FIG. 2, the VP9 specification defines an encoded bit stream format such that a portion 201 of an encoded bit stream 200 representing one frame comprises compressed tile data 204 of the frame and an associated header data 202 for that frame, which precedes the tile data 204 in the stream 200. The frame header 202, in turn, comprises an uncompressed portion 202U (uncompressed header) and a compressed portion 202C (compressed header). The uncompressed header 202U is a high-level description of the compressed frame that is encoded without the use of arithmetic encoding. The compressed header 202C, by contrast, is an arithmetically encoded and more detailed description of the compressed frame.

Among other things, the uncompressed header 202U can include—for a frame that may be used as a reference for a later frame—a bitmask ("refresh_frame_flags") that specifies which reference frame slot(s) in a frame buffer (408, FIG. 4—see below) of the receiver will be updated with the current frame after it is decoded. "Frame buffer", as used here, refers to a buffer that can store more than one frame (each frame in a "slot" of the buffer), which is sometimes referred to using different terminology such as decoded picture buffer. Slots can be populated and overwritten in any desired order, as signalled by the encoder.

The uncompressed header 202U comprises an "intra_only" flag bit, denoting whether or not the frame to which it relates uses only intra-encoding or whether it is at least partially inter-coded. If it at least party inter-coded (intra_only=0), the uncompressed frame header 202U also includes at least one and up to three buffer indexes, also called slot indexes ("ref_frame_idx[i]" for i=0, 1, 2) identifying which of the reference frames that have previously been stored in the frame buffer, as specified earlier by the refresh_frame_flags elements for those frames.

In the VP9 context, there are three of these syntax elements that are sent for non-I frames, even though there might be some different number of actual reference frames. Also, even within the VP9 context, although three of them are currently sent, some non-I frames may not actually refer to three distinct pictures. A variation of the idea would be to send some indication of how many of the frame identifiers are sent with the header data. This could be done, e.g., by sending a number that indicates how many are sent, or by sending a presence/absence indication flag for each potentially used reference frame.

Further details of the ref_frame_idx[i] and refresh_frame_flags syntax elements can be found in the VP9 Specification and the associated concepts of multiple-frame buffering and the usage of reference frames will be familiar already to those skilled in the art. For that reason, further details are not described herein.

In some systems, the decoder at the receiver may be arranged to send feedback to the encoder of the transmitter via a feedback channel, preferably via the same network.

In a conventional system, the feedback channel may be used to enable the encoder on the transmitter to determine that a frame was experienced as lost at the receiver, for example due to the loss of some packets sent through the packet-based network. There are two ways in which this may be achieved. Firstly, in a negative feedback scheme, the decoding system may signal back to the encoder on the transmitter that a frame was experienced as lost at the receiver (a loss report). Secondly, in a positive feedback scheme, the feedback channel may also be used to signal back to the encoder that a frame was successfully received at the receiver (an acknowledgement), thus the encoder may determine that a frame was lost at the receiver when it does not receive an acknowledgement. Typically, if a frame that is used as a reference frame for inter prediction of other subsequent frames is lost, this causes severe distortions in the decoded video that can last for a long time unless actions are taken or unless the encoder has managed the frame referencing dependencies to prevent such propagation of distortion. One such action is for the encoder to generate a "recovery frame", such as an IDR-frame, that will stop error propagation when received and decoded.

It is common for some frames to be used as reference frames and other frames (known as non-reference frames) not to be used as reference frames.

Also, sometimes the prediction structure within a coded video sequence may involve hierarchical layering, so some frames may be used as references but only by a subset of frames. In such a case, loss of a frame can sometimes only cause distortion that propagates to a subset of the subsequent frames. In some cases, this may be a small subset. Detecting loss in this context can be useful even without a feedback channel.

A frame may be deemed "lost" at the receiver when it is not successfully received and/or not successfully decoded by the receiver. Hence, a frame may be "lost" at the receiver due to packet loss on the network. Alternatively, a frame may be "lost" at the receiver due to corruption of frame data (i.e. the frame was received by the receiver, but the received frame contains data errors which result in it not being decodable), and the corruption cannot be corrected using error correction. As an additional alternative, a frame may be "lost" at the receiver if the frame was received by the receiver but the decoder had insufficient computing resources available to decode it in a timely fashion. In general, a frame (or more generally a portion) may be considered lost at the receiver if it has not been both received and decoded at the receiver.

In a positive feedback scheme, the encoder is informed of every successfully received frame and hence has information pertaining to which frames have been successfully decoded by the decoder. Hence, in this scheme the recovery frame may also be a frame that is inter coded with respect to an error-free frame known to be available in the decoder (known to be error free because it has itself been acknowledged as received and decoded). The latter generally results in a lower bit rate at a given quality compared to the former. The disadvantages associated with sending a recovery frame are bit rate overshoots (rate spikes) or alternatively an increase in source coding distortion. Bit rate overshoots can in turn cause new losses or forcing the encoder to drop frames or drastically increase source coding distortion to a degree that might be perceptually disturbing.

Other systems may operate without any such feedback channel. In this case, the decoder may still usefully detect when a frame has been lost, even though it does not have the option of requesting a recovery frame from the transmitter. That is, a decoder may still perform some form of loss-recovery without a feedback channel. For example, upon detecting a lost frame, the decoder may "freeze" the video, i.e. to render a static image based on an error-free frame successfully received before the lost frame, which may be less noticeable and lead to a lower-level of perceptual distortion that allowing any propagating errors to be rendered, or the decoder may perform some other form of loss concealment.

SUMMARY

The present invention provides what are referred to herein as frame descriptions (or equivalently, frame descriptors) for encoded video frames, which are generated by an encoder of a transmitting device and transmitted to a receiving device in association with the encoded frames to which they relate. These frame descriptors are specially adapted to allow robust and efficient loss detection at the decoder—particularly (though not exclusively) a frame that is lost in the sense that it is never successfully received and decoded at a decoder of the receiving device (as opposed to a frame that is received at the decoder but corrupted), as such losses are generally harder for the decoder to detect. For the avoidance of doubt, it is noted that the techniques can be used to detect any form of frame loss, with or without a feedback channel.

A first aspect of the present invention is directed to a method of decoding encoded video data at a decoding device, the method comprising, at the receiving device:

receiving an encoded first frame of the video data and a current frame description of the encoded video data for the first frame comprising: an identifier (ID) of the first frame, and an indicator of a storage location at the receiving device for the first frame and its frame identifier;

decoding the first frame;

storing the first frame and its frame identifier at the storage location indicated in the current frame description;

receiving an encoded second frame of the video data and at least one reference frame description of the encoded video data for the second frame comprising: a reference frame identifier, and an indicator of said storage location.

Preferably, the method of the first aspect further also comprises, at the receiving device:

using the indicator in the reference frame description to access said storage location;

comparing the frame identifier stored thereat with the reference frame identifier; and if the compared frame identifiers match, decoding the second frame using inter-frame decoding with the first frame stored thereat as a reference frame.

If the compared frame identifiers do not match, this indicates that at least one reference frame is not available at the receiving device for decoding the second frame. In that event, the decoder may implement a frame loss recovery process in response.

As another example, if the compared frame identifiers do not match, in response the receiving device may transmit a lost frame notification, such as a missing reference frame notification or a notification of a failure to successfully decode the said second frame to the transmitting device via a feedback channel (both of which amount to frame losses in the above sense).

For example, if the compared frame identifiers do not match, in response the receiving device may generate at least one loss concealment frame to replace the second frame. This is particularly, though not exclusively applicable where no feedback channel is available.

Note the term "storage location" is not limited to a physical storage location (i.e. a physical region of memory), but can also refer to a logical storage location. It can for example be a buffer index (equivalently, slot index) identifying a slot in a frame buffer having multiple slots, which can be a local entity, i.e. a software abstraction that disguises the lower level implementation details of the physical storage.

Also note that, whilst references to "receiving video data" can mean that the video data (i.e. the encoded frames and associated frame descriptions) is received via a network from another device as in the described example, the terminology is not limited to this, and can for example refer to pre-encoded video data that is accessed from local storage at the decoding device. In this case the encoded video data (i.e. the encoded frames and associated frame descriptions) is stored on a storage medium and received therefrom. For example, the video may be received from a disk such as a DVD, which may sometimes result in corrupted data and hence lost frames in the above, e.g., due to scratches or other physical damage.

Note also that, in the context of video transmitted over a network, the video encoding may or may not be performed in real-time. For example, in non-real-time contexts, such as video broadcast or video streaming, the encoding is something that may happen long before the transmission. In a video broadcast system, there may be no feedback at all. In a streaming system, feedback may be used to enable the server to switch between different previously encoded chunks of video data, for example to adapt to changing network conditions.

Note also that the term "frame" as it is used herein generally means a portion of the video data corresponding to a particular point in time. In particular, it is noted that some video coding systems, especially those known as interlaced video systems operate by sending two "fields", a field being a picture consisting of only the odd numbered or even numbered lines of a video image. In interlaced scanning, these may be interleaved in time. For this reason, H.264 and MPEG-2 and some other specifications adopt a narrower definition of "frame" and make a distinction between what they call a "frame" (meaning both even and odd lines) and a "picture" (which might either be a field or a "frame" in this narrower sense). For the avoidance of doubt, the term "frame" as it is used is used in the broader sense, and an H.264 or MPEG-2 field (or similar) is a type of frame as that term is used herein.

A second aspect of the present invention is directed to a encoding of video data, the method comprising, at an encoding device:

encoding a first frame of the video data;

generating a current frame description for the first frame comprising: an identifier of the first frame, and an indicator of a storage location at the receiving device for the first frame and its frame identifier;

encoding at least a portion of a second frame of the video data using inter-frame encoding with the first frame as a reference frame; and generating at least one reference frame description for the second frame comprising: an identifier of the first frame, and an indicator of said storage location at the receiving device for the first frame and its frame identifier The encoded frames and frame descriptions are outputted as encoded video data, which may for example be transmitted via (i.e. over) a network to a receiving device (where the transmission may or may not be real-time) or stored on a computer-readable storage medium.

Preferably, the encoding device also outputs as part of the encoded video data, in association with at least one of the frame descriptions, one or both of the following:

a frame ID repetition allowance flag, which indicates a uniqueness level for the frame identifier in that frame description, a frame ID length indicator that identifies a length of the frame identifier in that frame description.

The frame length ID indicator allows the use of variable-length frame IDs, and in particular provides efficient extraction of a variable-length frame length identifier from surrounding data, for example adjacent data in a bit stream in which the frames and frame descriptions are transmitted, without the need for marker bits and the like. Preferably, the frame length indicator applies to multiple frame length identifiers (e.g. it may be included in a sequence description for a sequence of frames—see below), as this reduces the required overhead.

Using a longer frame ID makes it possible to distinguish effectively between different pictures—e.g., in the event of a loss of a large number of pictures. With a short ID, the same value will need to be re-used more often, which could result in cases where the ID value matches accidentally despite the loss of the reference frame. Robustness is improved if the ID is longer, but longer IDs require more bits of data to be sent in the frame header, at thus more overhead. The use of variable-length frame IDs provides flexibility for the encoder in deciding how best to balance these considerations.

The indication of the length of the ID may form part of a high level syntax. This data could be put into a higher level of syntax such as a "sequence header" (i.e. sequence parameter set for a sequence of multiple frames), as described in more detail below. In VP9 there is currently no such sequence header (or equivalent) in the high-level syntax, but the addition of a sequence header to VP9 is believed to be feasible.

The frame ID may also be used in some syntax outside the video bit stream (such as RTP payload format headers or feedback messages). In such a case it may be desirable to make sure that the length of the ID that is used in the bit stream is the same as the length used in that other syntax that is outside the video bit stream. This is another benefit of the ability to select different lengths for the IDs, since the video may be used in different system environments that would have different preferred lengths for the IDs.

The frame ID repetition allowance flag provides the encoder with flexibility in assigning the frame identifiers, whilst still ensuring predictable results at the decoder.

Inter-frame means at least a portion of the frame is encoded relative to one or more reference frames, i.e. as difference values between that (portion of) the frame and a value predicted from values in the reference frame(s). All of the frame may be encoded relative to one reference frame, or another portion(s) of the frame may be encoded using a different frame as a reference or using intra-frame encoding (with no reference). In some uses, such as those involving what is known as bi-prediction or combined prediction, a single region of the current frame may be predicted from values in two (or possibly more than two) reference frames. Note, for the avoidance of doubt, that bi-prediction is a form of inter-prediction as the latter term is used herein. The prediction value may not be a value that is copied directly from a reference frame, since, for example, a motion vector may have a non-integer value that causes the decoder to interpolate values at positions between the positions lying on the grid points in the reference frame.

References to inter-frame decoding shall be construed accordingly.

If the compared frame-identifiers do match, this indicates that the correct reference frame for the second frame has been successfully received. If they do not match, that indicates the reference frame for the second frame has been lost, allowing the loss to be detected at the receiving device. The receiving device can respond to a detected loss in a number of ways (with and without a feedback channel), some examples of which are described below.

In other words, the current frame description for a frame that might be used as a reference frame for a later frame comprises at least two pieces of data:
i. an indicator of a storage location at which it should be stored at the receiving device, and
ii. a frame identifier ("current_frame_id" in the examples below).

The current frame description can for example form part of a frame header for the frame. The first piece of current frame description data (i) can for example identify a buffer or slot index (as noted above), e.g. corresponding to the position of a corresponding flag within the "refresh_frame_flags" syntax element of the VP9 Specification, in the uncompressed header (202U, FIG. 2).

Note that, as shorthand, the present disclosure may sometimes refer to a syntax element within a bit stream (or similar). As will be apparent, this refers to data (one or more bits) at a position within the bit stream corresponding to the syntax element.

The reference frame description of a later frame, which uses that frame as a reference similarly comprises at least two pieces of data:
i. an indicator of the storage location (e.g. buffer index/slot) at which that reference frame should be already-stored at the decoder, and
ii. the identifier of the reference frame ("reference_frame_id[i]" in the examples below).

This allows the decoder to check whether the correct frame is stored at the specified buffer index/slot. The reference frame description can likewise form part of a frame header for the later frame. The first piece of reference frame description data may likewise identify a buffer index/slot, e.g. corresponding to the position of a corresponding flag within the "ref_frame_idx[i]" syntax element of the VP9 Specification, in the uncompressed header 202U.

The inclusion of these separate frame identifiers in the frame descriptions, in addition to the storage location indicators, provides greater reliability and robustness to lost frames. For example, VP9 does not provide any robustness to frame loss.

In some embodiments, if the compared frame identifiers do not match, in response the decoding device may generate at least one loss concealment frame to replace the second frame.

Alternatively or in addition, if the compared frame identifiers do not match, in response the encoding device may transmit a lost reference frame notification via a feedback channel to a transmitting device from which the video data is received.

The encoded video data may also comprise, for at least one of the frame descriptions, a frame ID length indicator that identifies a length of the frame identifier in that frame description. This may be generated by the encoding device and received at the decoding device.

The decoding device may use the frame ID length indicator to extract the frame identifier from that frame description.

The frame identifier may have a length equal to a sum of the frame length ID indicator and a predetermined constant.

The encoded video data may also comprise, for at least one of the frame descriptions, a frame ID present flag, wherein the comparing step is conditional on the frame ID present flag indicating the presence of the frame identifier in that frame description. This is generated by the encoding device and received at the decoding device.

The frames and the frame descriptions may be received at the decoding device in an encoded bit stream, the frame description forming header data of the encoded bit stream.

For example, the frame identifiers may be included in an uncompressed portion of the header data.

The storage location indicators in the current and reference frame descriptions may conform to the VP9 Specification.

The encoded video data may be received at the decoding device from a transmitting device via a network.

The frame ID length indicator may be received at the decoding device in a sequence description of the encoded video data, the sequence description pertaining to multiple frame descriptions received for a sequence of encoded frames of the video data, each of those frame descriptions comprising a frame identifier having a length indicated thereby.

The sequence description and the multiple frame descriptions may be received in a superframe comprising the sequence of encoded video frames. The sequence description may be carried in a superframe syntax structure of the superframe and the frame descriptions may be conveyed in frame header data associated with each coded frame.

The frame ID repetition flag may indicate a first or a second uniqueness case. That is, a uniqueness type ("uniqueness level") corresponding to first and second uniqueness cases, wherein frame identifiers having the first uniqueness level (i.e. for which the first case is indicated) and a length l are restricted to being unique within any sequence of $2^l$ of such frame identifiers generated in the encoded video data, wherein the second uniqueness level is such that said restriction does not apply (i.e. said restriction does not apply for frame identifiers for which the second case is indicated).

That is, in the first case frame ID uniqueness is required within the specified sequence of $2^l$ frames. In the second case, repetitions at various intervals are allowed, which may for example either signalled separately or fixed at less than $2^l$.

The frame ID repetition flag and/or the frame ID length indicator may form at least part of a sequence description of the encoded video data, the sequence description pertaining to multiple frame descriptions for a sequence of video frames in the encoded video data, each of those frame descriptions comprising a frame identifier having a length and/or a uniqueness level indicated thereby.

The sequence description and the multiple frame descriptions may form part of a superframe of the encoded video data, in which the sequence description is conveyed in a high level of the superframe syntax and the frame descriptions are conveyed in frame header data associated with each coded frame.

The frame descriptions, and the frame ID repetition flag and/or the frame ID length indicator may be transmitted to a receiving device via a network in a sequence of RTP payloads.

The frame identifiers may be transmitted as absolute values i.e. by direct representation of the identifiers as numeric values, i.e. not represented as differences relative to the frame identifier of any other frame or using some other indirect form of representation.

Another aspect of the present invention is directed to a decoding device, the decoding device comprising a data interface configured to receive encoded video data and a decoder configured to apply, to the encoded video data, the method of the first aspect or any embodiment thereof.

Another aspect of the present invention is directed to an encoding device comprising a data interface configured to receive video data to be encoded and an encoder configured to apply, to the video data, the method of the second aspect or any embodiment thereof.

The encoder can for example be a software encoder executed on a processor of the transmitting device, in dedicated encoder circuitry of the transmitting device, or a combination of both. Likewise, the decoder can be implemented as a software decoder executed on a processor of the receiving device, in dedicated decoder circuitry, or a combination of both.

In some contexts, the encoded video data may be transmitted from the encoding device (transmitting device, in this context) to the decoding device (receiving device, in this context via a network).

A third aspect of the present invention is directed to a method of decoding video data received at a receiving device via a network from a transmitting device, the method comprising, at the receiving device:

receiving from the transmitting device via the network an encoded first frame of the video data and a current frame description for the first frame comprising: an identifier (ID) of the first frame, and an indicator of a storage location at the receiving device for the first frame and its frame identifier;

decoding the first frame;

storing the first frame and its frame identifier at the storage location indicated in the current frame description;

receiving from the transmitting device via the network an encoded second frame of the video data and at least one reference frame description for the second frame comprising: a reference frame identifier, and an indicator of said storage location.

Preferably, the method of the first aspect further also comprises, at the receiving device:

using the indicator in the reference frame description to access said storage location;

comparing the frame identifier stored thereat with the reference frame identifier; and if the compared frame identifiers match, decoding the second frame using inter-frame decoding with the first frame stored thereat as a reference frame.

A fourth aspect of the present invention is directed to a method of transmitting video data from a transmitting device to a receiving device via a network, the method comprising, at the transmitting device:

encoding a first frame of the video data;

generating a current frame description for the first frame comprising: an identifier of the first frame, and an indicator of a storage location at the receiving device for the first frame and its frame identifier;

transmitting to the receiving device via the network the encoded first frame with its current frame description;

encoding at least a portion of a second frame of the video data using inter-frame encoding with the first frame as a reference frame;

generating at least one reference frame description for the second frame comprising: an identifier of the first frame, and an indicator of said storage location at the receiving device for the first frame and its frame identifier; and transmitting to the receiving device via the network the encoded second frame with its reference frame description.

Preferably, the transmitting device also transmits to the receiving device, in association with at least one of the frame descriptions, one or both of the following:

a frame ID repetition allowance flag, which indicates a uniqueness level for the frame identifier in that frame description, a frame ID length indicator that identifies a length of the frame identifier in that frame description.

In some embodiments, the transmitting device may transmit to the receiving device, for at least one of the frame descriptions, a frame ID length indicator that identifies a length of the frame identifier in that frame description.

The receiving device may use the frame ID length indicator to extract the frame identifier from that frame description.

The frame identifier may have a length equal to a sum of the frame length ID indicator and a predetermined constant. This reduces the number of bits needed to indicate the length of the frame identifiers.

The transmitting device may transmit to the receiving device, for at least one of the frame descriptions, a frame ID present flag (referred to as "frame ID flag" for conciseness), wherein the comparing step is conditional on the frame ID flag indicating the presence of the frame identifier in that frame description. That is, the comparing step is performed because the frame ID flag is set to indicate that the frame identifier is indeed present (and would not be performed otherwise).

The frames and the frame descriptions may be transmitted from the transmitting device to the receiving device in an encoded bit stream, the frame description forming header data of the encoded bit stream.

For example, the frame identifiers may be included in an uncompressed portion of the header data (e.g. the VP9 uncompressed header).

The storage location indicators in the current and reference frame descriptions may conform to the VP9 Specification.

The frame identifiers may be represented in the frame description directly as numeric values.

The frame ID length indicator may be transmitted from the transmitting device to the receiving device in a sequence description, the sequence description pertaining to multiple frame descriptions received for a sequence of encoded frames of the video data, each of those frame descriptions comprising a frame identifier having a length indicated thereby. As noted above, this reduces the required overhead, as one frame ID length indicator indicates the length of each of the frame identifiers for the sequence of frames.

The sequence description and the multiple frame descriptions may be transmitted in a superframe (e.g. VP9 superframe) comprising the sequence of encoded video frames. The sequence description may be carried in a superframe syntax structure of the superframe and the frame descriptions may be conveyed in frame header data associated with each coded frame.

As noted, the transmitting device may also transmit to the receiving device, in association with at least one of the frame descriptions, one or more of the following syntax elements:
  a. a frame ID repetition flag, and/or
  b. a frame ID length indicator, and/or
  c. a frame ID present flag.

The frame ID repetition flag may indicate a first or a second uniqueness level, wherein frame identifiers having the first uniqueness level and a length l are restricted to being unique within any sequence of $2^l$ of such frame identifiers appearing consecutively in the bitstream as generated by the encoder for the video data, and the second uniqueness level is such that said restriction does not apply.

The frame ID repetition flag and/or the frame ID length indicator and/or the frame ID present flag may be transmitted to the receiving device in a sequence description, the sequence description pertaining to multiple frame descriptions for a sequence of video frames transmitted to the receiving device, each of those frame descriptions comprising a frame identifier only if the frame ID present flag indicates as such (assuming it is included), each having a length and/or a uniqueness level indicated by the relevant syntax element if included.

The sequence description and the multiple frame descriptions may be transmitted from the transmitting device to the receiving device in a superframe, in which the sequence description is conveyed in a high level of the superframe syntax and the frame descriptions are conveyed in frame header data associated with each coded frame.

The frame descriptions, and the frame ID repetition flag and/or the frame ID length indicator may be transmitted in a sequence of RTP payloads.

The frame identifiers may be transmitted as "absolute" values i.e. directly as numeric values.

Another aspect of the present invention is directed to a receiving device for decoding video data received from a transmitting device, the receiving device comprising a communications interface configured to connect to a network and a decoder configured to implement the method of the third aspect or any embodiment thereof.

Another aspect of the present invention is directed to a transmitting device for transmitting video data to a receiving device, the transmitting device comprising a communications interface configured to connect to a network and an encoder configured to implement the method of the fourth aspect or any embodiment thereof.

The encoder can for example be a software encoder executed on a processor of the transmitting device, in dedicated encoder circuitry of the transmitting device, or a combination of both. Likewise, the decoder can be implemented as a software decoder executed on a processor of the receiving device, in dedicated decoder circuitry, or a combination of both.

Another aspect of the present invention is directed to a computer program product comprising code stored on a computer readable storage medium and configured when executed at a receiving device to implement any of the methods, or encoder or decoder functionality disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

For a better understanding of the present invention, and to show how embodiments of the same may be carried into effect, reference is made to the following figures in which.

DETAILED DESCRIPTION OF EXAMPLE EMBODIMENTS

The "AV1" video codec is currently being developed by the Alliance for Open Media (AOM). The inventors anticipate that the present invention may have applications in the context of the AV1 codec, and example embodiments of the present invention are described below in the context of AV1 to assist in understanding how the present techniques might be implemented as part of the anticipated AV1 standard. In particular, to provide loss detection and recovery using non-IDR frames for the AV1 video codec, with and without a feedback channel.

It is expected that the bit stream format of AV1 will build on that of VP9, and the context in which the embodiments are described below will be readily familiar to those familiar with VP9. As such, all of the teaching herein applies equally to the VP9 standard, and any references to "proposed modifications" or "proposed additions" and the like in the context of AV1 mean modifications of the bit stream format as defined in the VP9 Specification (with a view to proposing their adoption in the developing AV1 codec), unless otherwise indicated.

Figure 1:
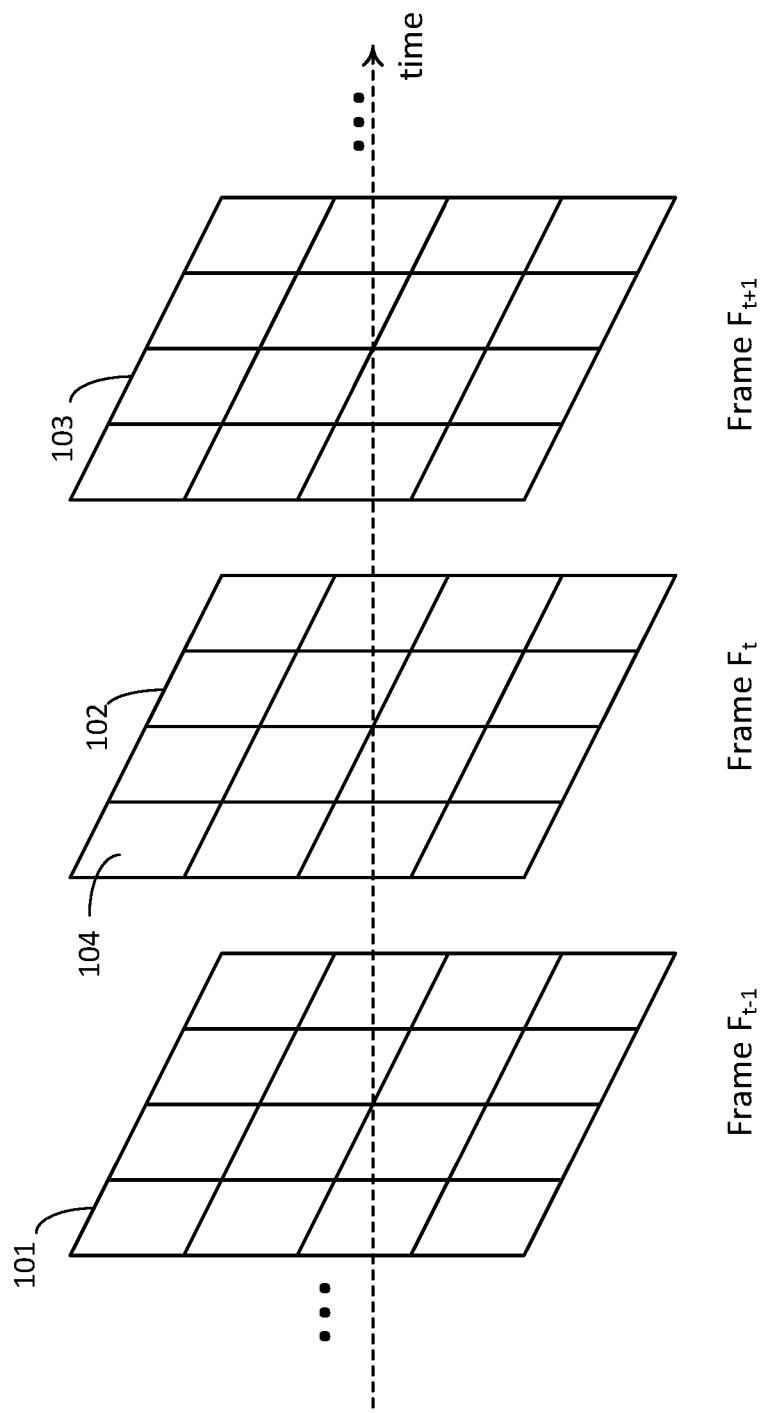
FIG. 1 schematically illustrates certain principles of a video coding scheme.
Figure 2:
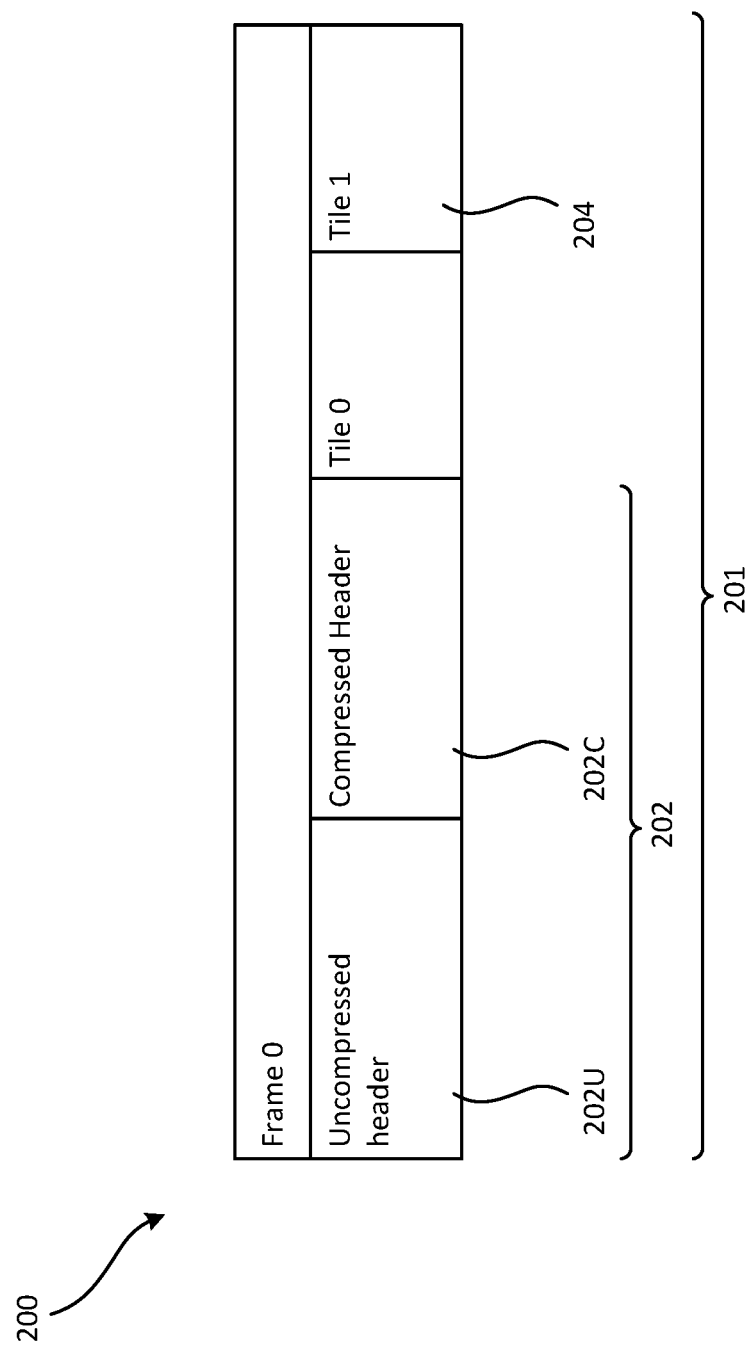
FIG. 2 illustrates the VP9 encoded bit stream format.

In particular, it is anticipated that the general principles of the VP9 frame structure will be adopted, as outlined above with reference to FIG. 2, where each frame in the encoded bit stream has a respective frame header 202 that precedes the encoded bytes 204 of that frames tile(s).

It will, however, be appreciated that the development of the AV1 video codec is ongoing, both at a technical level, and in terms of its terminology and syntax. For the avoidance of doubt it is noted that the examples described below are not necessarily exhaustive, i.e. there may well be other ways in which the present invention can be implemented within the framework of AV1 and/or VP9, and that in any event the present invention is not limited to AV1 or VP9, or indeed to any particular standard, specification or protocol. In particular, whilst current or anticipated terminology and syntax for a particular standard or specification may sometimes be used herein for the sake of convenience, the relevant description applies equally to corresponding features in any future developments of those standards and specifications, and to equivalent features in other current and future video codecs (whether or not they are documented), which may well use a different terminology or syntax in relation to such features.

For both real-time communication technologies—such as, real-time video calling (e.g. based on VoIP technology), or other real-time video communication events—and non-real-time (e.g., Internet streaming) communication systems to be able to use the AV1 codec in practice, the inventors of the present invention have recognized that robust support for loss detection and recovery under loss conditions is needed.

As described in further detail below, syntax and semantics additions to the AV1 codec specification are proposed, to provide support for loss detection and recovery using non-IDR frames, by:

adding a frame identifier (ID) present flag, frame ID length and frame ID repetition prohibited flag to the frame header, and in particular to a "sequence header" of the frame header;

adding frame identifiers (IDs) for the current frame and up to three reference frames in the uncompressed frame header;

using these frame IDs to verify that the buffer indexes refer to valid reference frames.

Usage scenarios and associated trade-offs for applications with and without feedback channels are discussed. The alignment of the proposed solution with RTP is also discussed, which is relevant certain real-time video applications such as VoIP video calling. The proposed changes in light of the support provided by an RTP payload specification are also discussed.

Figure 3:
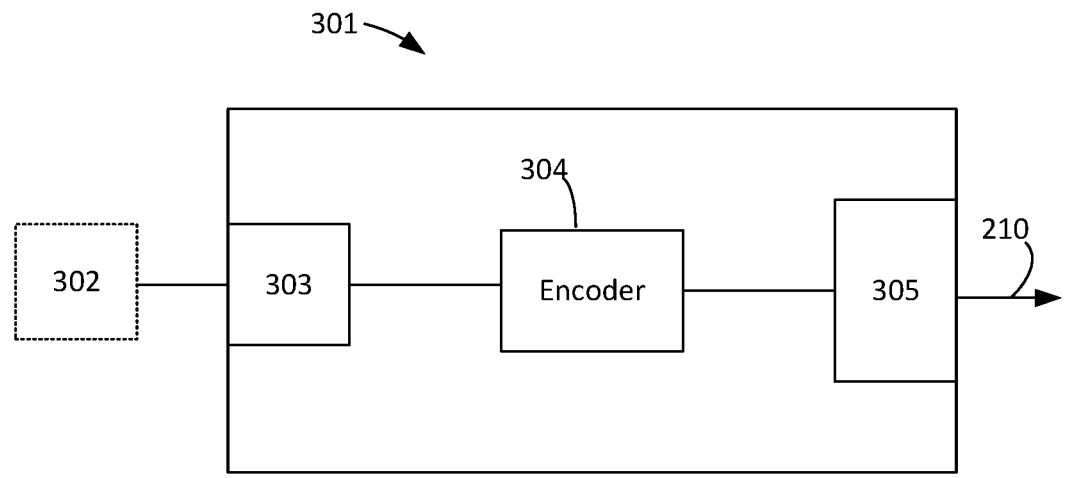
FIG. 3 shows a block diagram of a transmitting device.

FIG. 3 shows a transmitter 301 according to various embodiments of the present invention. The transmitter 301 comprises an input 303 for receiving raw video data from a data source 302, an encoder 304 and a communications interface 305. The data source 302 can be any suitable source from which raw video data can be received by the transmitter 301. For example, the input 303 may be connected to a wired or wireless network over which raw video data may be accessed from an external source. Alternatively, the data source 302 may be a video camera which provides raw video data to the transmitter 301 via the input 303. For example, a webcam may provide raw video data to the transmitter 301 for encoding in a video call application scenario.

The input 303 is operatively connected to the encoder 304 and the encoder 304 is operatively coupled to the communications interface 305. In operation, the encoder 304 receives raw video data via the input 303, encodes (i.e. compresses) the raw video data and supplies the encoded video data to the communications interface 305 as a sequence of encoded video frames. The principles of this are known in the art and set out above in the Background section. The focus of the present disclosure is not on the video compression as such, but rather on the generation by the encoder 304 of associated header data for use in decoding, and in particular for use in loss detection and compensation.

The communications interface 305 is arranged to transmit the encoded video data as an encoded video stream 210 over a network, preferably a packet-based network such as the Internet or another network built on the TCP/IP Protocol Suite. The video stream can be transmitted using wired or wireless network technology, or a combination of both.

Figure 4:
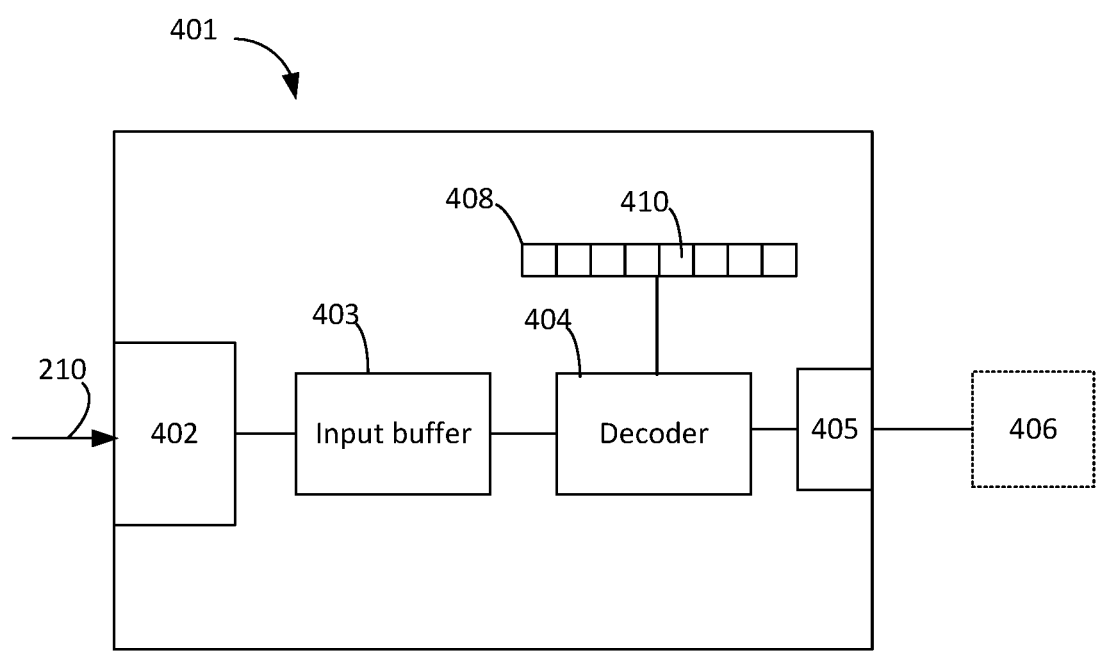
FIG. 4 shows a block diagram of a receiving device.

FIG. 4 illustrates a receiver 401 according to the present invention. The receiver 401 comprises a communications interface 402, an input buffer 403, a decoder 404, an output 405, and a frame buffer 408. The communications interface 402 is operatively coupled to the input buffer 403. The input buffer 403 is operatively coupled to the decoder 404. The decoder 404 is operatively coupled to the output 405 and to the frame buffer 408.

The communications interface 402 is arranged to receive the encoded video stream 210 from the transmitter 301 over the network and supply the encoded video data to the input buffer 403. The input buffer 403 stores encoded video data of the received stream 210 ready to be decoded by the decoder 404. The decoder 404 retrieves encoded video data from the buffer 403, decodes the encoded video data and supplies it to the output 405. It also stores certain decoded video frames (or at least portions thereof) in the frame buffer 408 in the manner described below.

The output 405 is arranged to output the decoded video data to a video output device 406 which may be any suitable device which is capable of interpreting the decoded video data and outputting the video. For example, the video output can comprise a display screen or other display device (e.g. headset device) for displaying the decoded video to a user.

The encoder 304 and/or decoder 404 can for example be implemented as software. That is, as code executed on a processor or processors (e.g. CPU(s)) of the transmitter 301 or receiver 401 respectively. Alternatively, the encoder 304 and/or decoder 404 may be implemented in dedicated hardware of the transmitting device 301 or receiving device 401, such as an FPGA(s) and/or application-specific integrated circuitry. Alternatively, the encoder 304 and/or decoder 404 can be implemented as a combination of software and dedicated hardware.

The transmitter 301 and receiver 401 are preferably computer devices, for example user devices (e.g. smartphone, tablet device, laptop or desktop computer, television, or newer forms of user device such as smartwatches, headsets etc.), or server devices for use in a back-end system (e.g. part of a cloud computing platform).

For example, the code may form part of a communication client application, which allows a user to engage in real-time communication events (such as video calls) over the network, or alternatively it can be back-end code executed on a server(s), e.g. in a trans-coding application. Alternatively, the encoder/decoder may be built-in decoders of the device in questions, for example of the type found in some games consoles or video servers (e.g. special-purpose transcoding servers).

At the hardware level, the buffers 403, 408 can be implemented using any suitable form of electronic storage. For example, magnetic storage, solid-state storage or a combination of both.

Note that the term "storage location" as used herein can mean a logical storage location, for example identified by a buffer index (also called a slot index, in keeping with the terminology of the VP9 Specification). Whilst this does ultimately correspond to a region or regions of physical storage, this correspondence is not necessarily visible to the decoder 404.

A number of "slots" 410 are maintained in the frame buffer 408, where each of the slots 410 can be used to store one (and only) one decoded frame at a time. The indicator of the storage location in the current frame description of a received frame specifies which of these slots 410 it should be stored in when decoded, overwriting any frame already stored in that slot. The number of slots may be fixed, e.g. in the examples below it is fixed at eight slots total, in keeping with the VP9 codes, however the number may be different and/or variable in other contexts.

The encoded video stream 210 is a bit stream, which is generated by the encoder 304 and decoded by the decoder 404 according to the methodology described below. A noted above, these are based on VP9 with a view to proposing their adoption in AV1 in due course, and any references to "proposed modifications" or "proposed additions" (or similar) in the following should be read as modifications to the VP9 bit stream format as defined in the VP9 Specification, unless otherwise indicated.

As such, the encoded bit stream 210 is generated using VP9 to the bit stream format described above in relation to FIG. 2, with additions that are described below. In some implementations, the encoded bit stream 210 may comprise additional header data in addition to the frame header 202 of FIG. 2.

In this context, the bit stream 210 is sometimes referred to as the AV1 bit stream below.

1. Outline of Methodology

For both higher-latency and real-time cases, detection of frame loss is useful. For real-time cases (e.g. VoIP calling), adequate support in the AOM specification for recovery from loss and errors is particularly important.

To recover from a state when a frame is lost, i.e. not decodable because either it was not received or it was received with errors that cannot be corrected, an IDR frame or non-IDR frame can be used. The former has the advantage of simplicity at the expense of higher bit rate. The latter has the advantage of lower bit rate at the expense of using more logic (that is, requiring more sophisticated processing, and therefore more computational resources). The bit rate savings are due to the fact that the recovery frame can use inter-frame prediction with respect to some frame(s) that are available (either approximately or exactly, either in full or in part) at the decoder, in the frame buffer 408.

A level of support for non-IDR frame recovery exists in previous video coding standards. For example, in HEVC [[1] High Efficiency Video Coding, ITU-T H.265, T-REC-H.265-201504] there are explicit frame counters in the slice headers and an elegant solution to handle long term reference (LTR) frames. In H.264 [[2] Advanced Video Coding for Generic Audiovisual Services, ITU-T H.264, T-REC-H.264-2012] there are also frame counters signalled in the frame headers and there is support for LTR frames, however the buffer indexes are not designed in a way that is as safe for use in error prone environments.

The Payload Content Scalability Information (PACSI) in RTP Payload Format for Scalable Video Coding, [RFC6190—S. Wenger, Y.-K. Wang, T. Schierl, A. Eleftheriadis, May, 2011] was extended with CurrFrame and RefFrame frame counters, represented with 16 bits each. In the real-time transport protocol (RTP) protocol backward channel, the picture loss information (PLI) syntax was also extended with the last known good (LKG) and Current Frame at Decoder (CFD) counters, 16-bits each. The detailed solution, usage and the recovery scenario are described in the Applicant's co-pending U.S. patent application Ser. No. 14/847,375.

In VP9, the existing mechanism for reference frame selection provides only some of what is needed for robust recovery using non-IDR frames. As noted, the decoder maintains a pool of eight slots in a frame buffer, of which at most three (sometimes called Last, Golden, and AltRef) can be selected in the frame header to be used as references for inter prediction when a new frame is sent—using the ref_frame_idx header element. The frame header also indicates which (if any) of the slots of the frame buffer should have their content replaced by the new frame after it is decoded—i.e. the refresh_frame_flags syntax element. However, the inventors have recognized that the use of buffer indexes alone is not sufficiently robust for real-time application in particular.

The mechanisms described below allow the decoder 404 to detect losses in the bit stream 210 and recover from them using non-IDR frames, using (only) data sent within the AV1 bit stream 201, with or without a feedback mechanism. Because this solution does not require feedback signals outside the codec, it can be applied in a wide range of applications and scenarios.

2. Proposed Syntax

The proposed syntax changes consist of the addition of the following syntax elements to header data of the bit stream 201:

a. A frame_id_numbers_present_flag, frame_id_length_minus7 and frame_id_repetition_prohibited_flag b. A current_frame_id (current frame identifier) and previous_frame_id[i], with i∈{0, 1, 2} (reference frame identifiers).

These are used in conjunction with the ref_frame_idx[i] and refresh_frame_flags data to provide robust detection of lost frames.

The combination of refresh_frame_flags and current_frame_id is an example of a current frame descriptor as that term is used herein. The combination of ref_frame_idx[i] and previous_frame_id[i] for a given constitute a reference frame description as that term is used herein (in this example, a frame can have up to three associated reference frame description for i=0, 1, 2).

Preferably, syntax elements 1) in the above list are added to a "sequence header" of the encoded bit stream 210. The sequence header is not part of the VP9 specification, and is a proposed addition to the AV1 bit stream 201—see section 2.1 below.

However, another viable option is for the syntax elements 1) to be added to the uncompressed header 202U instead.

The syntax elements 2) in the above list are added to the frame header 202 for the frame to which they relate. They are preferably added to the uncompressed header 202U—see section 2.2 below.

As in the VP9 Specification, these have a type, where a type of "f(n)" denotes an unsigned n-bit number appearing directly in the bit stream 210.

2.1 Syntax Changes in the Sequence Header

The proposed syntax changes are included in yellow in Table 1. These changes are intended to be part of the sequence header, which is described in detail below.

These syntax elements are summarized in this section, and further details are described in section 3 below.

The frame_id_numbers_present_flag is represented using one bit, and indicated whether or not the current_frame_id and previous_frame_id[i] identifiers are present for the frame(s) to which the flag relates. When present, each of these frame identifier has a length in bits (frame ID length), which has a values between 7 and 15, inclusive.

The frame ID length is identified by the frame_id_length_minus7 element, and is computed as frame_id_length_minus7+7, where frame_id_length_minus7 has values from 0 to 8, inclusive.

The frame_id_repetition_prohibited_flag is represented using one bit. When the value of this flag is equal to 1, the frame ID values cannot be repeated except as necessary to fit within the number of bits used to represent the frame ID values. That is, the frame ID can repeat at most every $2^l$ frames where l=frame_id_length_minus7+7 is the frame ID length. When the value of the flag is equal to 0, this constraint does not apply, and in this case it is left for the encoder 304 to ensure that it selects frame IDs in a consistent and predictable manner.

Table 1 below summaries how these syntax elements can be incorporated in the sequence header.

TABLE 1

| Syntax changes in the sequence header | |
|---|---|
| sequence_header( ){ | Type |
| ... | |
|     frame_id_numbers_present_flag | f(1) |
|     if (frame_id_numbers_present_flag ) { | |
|         frame_id_length_minus7 | f(4) |
|         frame_id_repetition_prohibited_flag | f(1) |
|     } | |
| ... | |
| } | |

Alternatively, as noted, these can be added to the uncompressed frame header 202U at the cost of more overhead.

Sequence Header:

The sequence header is an additional type of header included in the bit stream 201, which comprises what is referred to herein as a "sequence description", which means a description of multiple consecutive frames in the bit stream 201 (i.e. a sequence of frames within the bit stream 210). That is, the sequence description is associated with and applies to a sequence of multiple frames.

This section set-out an approach for supporting sequence level header and metadata with the AV1 codec without a major restructuring of the existing VP9 syntax. The proposed syntax and semantics updates are relative to the VP9 Draft 0.6 mentioned above. The main changes with respect to the VP9 Specification are:

Modifying the existing "superframe" syntax structure of VP9 to support different units such as frames, metadata and header information, as defined in sections 5.26, 5.27 and Annex B of the VP9 Specification.

Adding a sequence header structure, carried in the superframe syntax structure, that contains coding information that persists over a sequence of frames. Most of the proposed syntax elements in the sequence header structure are already present in VP9/AV1, they have been refactored and moved to the sequence header. The changes relate mostly to sections 6.1 and 6.3 in the VP9 draft.

Superframes:

VP9 supports consolidating multiple compressed units (sequence headers, metadata or frames) into one single chunk called a superframe.

Figure 7:
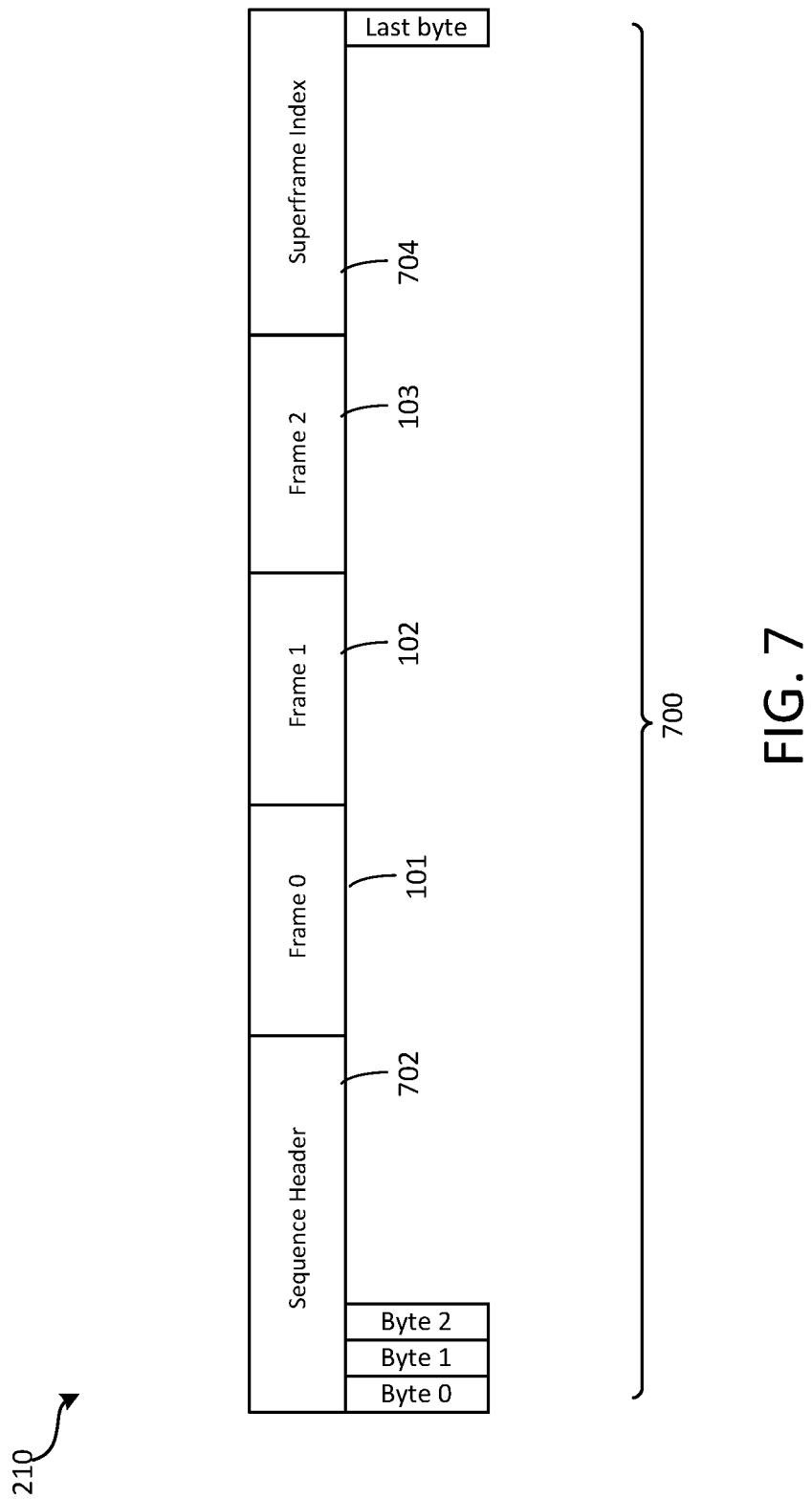
FIG. 7 illustrates a superframe structure based on VP9.

Using the terminology of VP9, and with reference to FIG. 7, a superframe 700 is a chunk of data (i.e. a portion of the bit stream 210) containing one or more coded frames 101, 102, 103 and an index 704 at the end (super-frame index) describing the number and sizes of the coded frames 101, 102, 103. The enclosed headers, metadata and frames can be located by parsing this superframe index 704:

Although it does not have a sequence header at present, it is proposed for AV1 to support signalling sequence level information in a separate proposed Sequence Header. The header contains syntax elements that are persistent over a sequence of frames. The sequence header syntax is described in section 6.1. It is a requirement of the AV1 specification that the sequence header is only signalled within a superframe. No more than one sequence header shall be present in a superframe, and if present, it shall precede all coded frames in the superframe.

A sequence header is considered to be associated with the next frame that follows it in the bit stream. Such a frame shall be present for any sequence header. Proposal to the Alliance for Open Media (AOM) Aug. 24, 2016.

All key-frames have an associated sequence header in this example. If a sequence header is present that is associated with any non-key frame, the following applies:

if a preceding key frame is present in the bit stream, the content of the sequence header shall be the same as the content of the sequence header that is associated with the most recent preceding key frame in decoding order.

otherwise, if a sequence header is present that is associated with any previous frame, the content of the sequence header shall be the same as the content of the sequence header that is associated with that preceding frame. 700 is stored together. This format can be useful to ensure that each superframe produces a single decoded frame even though the video is coded using unshown frames, sequence headers and/or related metadata. However, it is also permitted for a superframe to result in multiple output frames, or even no output frames.

Each of the encoded frames 101, 102, 103, in turn, has a respective frame header of the kind described herein, though this is not shown explicitly in FIG. 7.

Sequence Header:

It is proposed for AV1 to support signalling sequence level information in a separate sequence header, as noted. The header contains syntax elements that are persistent over a sequence of frames. The sequence header is only signalled within a superframe 700. No more than one sequence header should be present in a superframe 700, and if present, it precedes all coded frames 101, 102, 103 in the superframe 700.

A sequence header is considered to be associated with the next frame that follows it in the bit stream. Such a frame should be present for any sequence header.

It is proposed for all key-frames to have an associated sequence header. If a sequence header is present that is associated with any non-key frame, the following applies:

if a preceding key frame is present in the bit stream, the content of the sequence header shall be the same as the content of the sequence header that is associated with the most recent preceding key frame in decoding order.

otherwise, if a sequence header is present that is associated with any previous frame, the content of the sequence header shall be the same as the content of the sequence header that is associated with that preceding frame.

The multiple frames to which the sequence header applies:

either all have frame identifiers, or none have frame headers, as indicated on a single frame ID present flag in the sequence header all have frame IDs of the same length, as indicated by a single frame ID length indicator in the sequence header, are all prohibited from repeating in the above sense or none are, depending on a single frame ID repetitions flag in the sequence header.

2.2 Syntax Changes in the Uncompressed Frame Header

For "regular frames" (i.e. portions of the bit stream 210 containing to actual video data), the VP9 frame structure contains the uncompressed header 202U, the compressed header 202C and the tile data 204.

For "special-case frames", an uncompressed header 202U is sent alone to signal that a previously decoded frame should be displayed (i.e. with no compressed header to tile data, which would incur unnecessary overhead).

It is proposed that syntax elements 2) are added to the uncompressed header 202U. As such, these elements can be included not only for regular frames but also special-case frames in the above sense.

Figure 5:
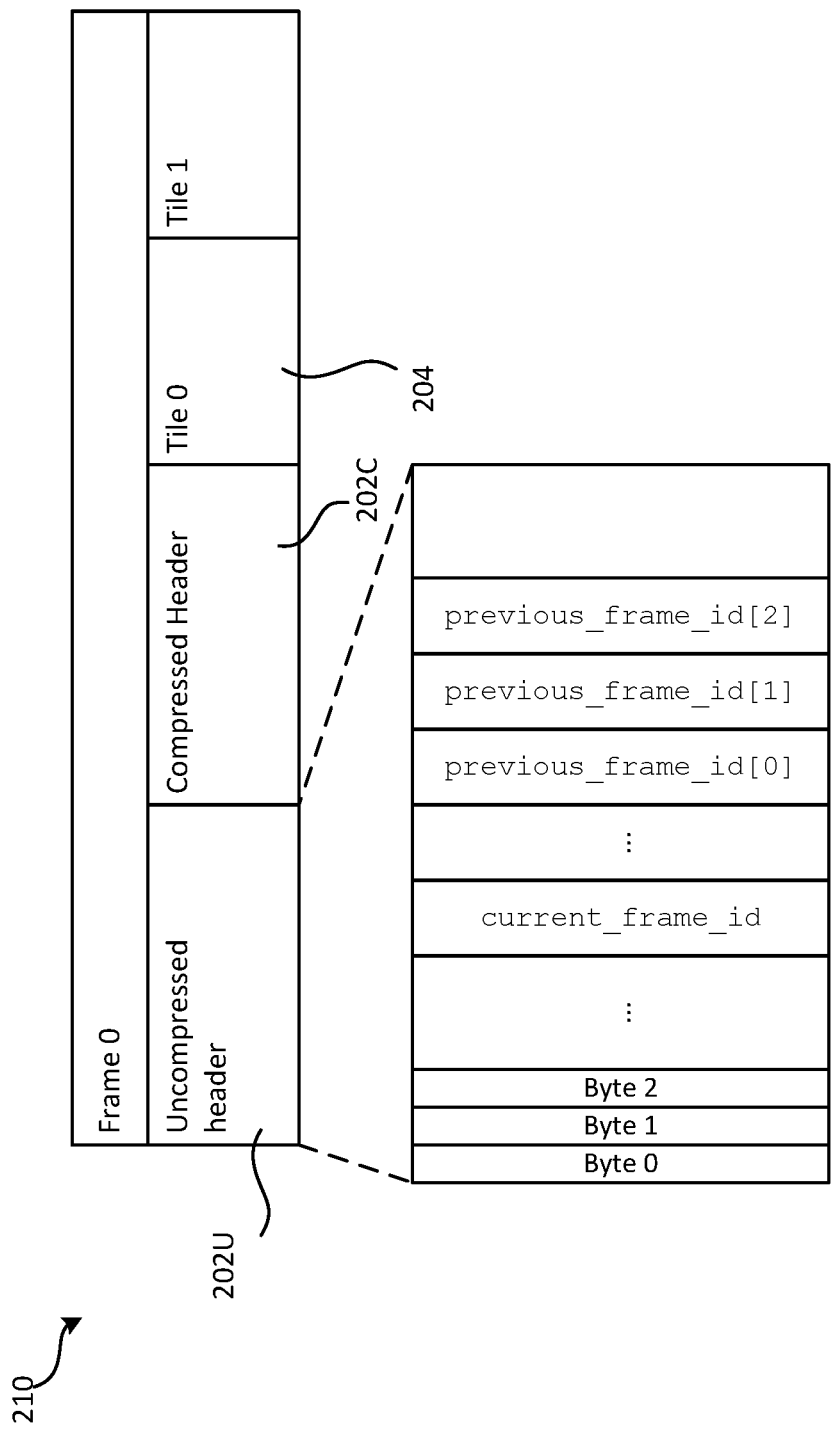
FIG. 5 illustrates one way in which novel syntax elements may be incorporated in a VP9 header.

This is illustrated schematically in FIG. 5, where current_frame_id is the frame identifier of the current frame (i.e. the frame made up of the tiles 204 to which the header 202U related); previous_frame_id[i], with $i \in \{0, 1, 2\}$, are the frame identifiers of the reference frames (e.g. maximum 3, following VP9) that are used as references for the decoding of the current frame. That is which have been used as references in intra-encoding of the current frame.

These syntax elements are read from the bit stream by the decoder 404 only if the frame_id_numbers_present_flag in section 2.1 is equal to 1. Similar to the rest of the parameters in the uncompressed header, each of the proposed counters is represented using 7 to 15 bits. Table 2 sets out an example header syntax, in which the proposed syntax changes are marked in the right hand-column with a "*" symbol.

TABLE 2

The uncompressed header syntax

| uncompressed_header( ){ | Type |
|---|---|
| frame_marker | f(2) |
| profile_low_bit | f(1) |
| profile_high_bit | f(1) |
| Profile = (profile_high_bit << 1) + profile_low_bit | |
| if (Profile == 3) | |
|   reserved_zero | f(1) |
| show_existing_frame | f(1) |
| if (show_existing_frame == 1){ | |
|   frame_to_show_map_idx | f(3) |
|   header_size_in_bytes = 0 | |
|   refresh_frame_flags = 0 | |
|   loop_filter_level = 0 | |
|   return | |
| } | |
| LastFrameType = frame_type | |
| frame_type | f(1) |
| show_frame | f(1) |
| error_resilient_mode | f(1) |
| *  if (frame_id_numbers_present_flag){ | |
| *    current_frame_id | f(frame_id_length_minus7+7) |
| *  } | |
| if (frame_type == KEY_FRAME){ | |
|   frame_sync_code( ) | |
|   color_config( ) | |
|   frame_size( ) | |
|   render_size( ) | |
|   refresh_frame_flags = 0xFF | |
|   FrameIsIntra = 1 | |
| } else { | |
|   if (show_frame == 0){ | |
|     intra_only | f(1) |
|   } else { | |
|     intra_only = 0 | |
|   } | |
|   FrameIsIntra = intra_only | |
|   if (error_resilient_mode == 0){ | |
|     reset_frame_context | f(2) |
|   } else { | |
|     reset_frame_context = 0 | |
|   } | |

TABLE 2-continued

The uncompressed header syntax

| uncompressed_header( ){ | Type |
|---|---|
|     if (intra_only == 1){ | |
|       frame_sync_code( ) | |
|       if (Profile > 0){ | |
|         color_config( ) | |
|       } else { | |
|         color_space = CS_BT_601 | |
|         subsampling_x = 1 | |
|         subsampling_y = 1 | |
|         BitDepth = 8 | |
|       } | |
|       refresh_frame_flags | f(8) |
|       frame_size( ) | |
|       render_size( ) | |
|     } else { | |
|       refresh_frame_flags | f(8) |
|       for (i=0; i < 3; i++){ | |
|         ref_frame_idx[i] | f(3) |
|         ref_frame_sign_bias[LAST_FRAME + 1] | f(1) |
| *        if (frame_id_numbers_present_flag){ | |
| *          previous_frame_id[i] | f(frame_id_length_minus7+7) |
| *        } | |
|       } | |
|       frame_size_with_refs( ) | |
|       allow_high_precision_mv | f(1) |
|       read_interpolation_filter( ) | |
|     } | |
|   } | |
|   if (error_resilient_mode == 0){ | |
|     refresh_frame_context | f(1) |
|     frame_parallel_decoding_mode | f(1) |
|   } else { | |
|     refresh_frame_context = 0 | |
|     frame_parallel_decoding_mode = 1 | |
|   } | |
|   frame_context_idx | f(2) |
|   if (FrameIsIntra \|\| error_resilient_mode){ | |
|     setup_past_independence( ) | |
|     If (frame_type == KEY_FRAME \|\| | |
|       error_resilient_mode == 1 \|\| | |
|       reset_frame_context == 3) { | |
|       for (i=0; i<4; i++){ | |
|         save_probs(i) | |
|       } | |
|     } else if (reset_frame_context = 2){ | |
|       save_probs(frame_context_idx) | |
|     } | |
|     frame_context_idx = 0 | |
|   } | |
|   loop_filter_params( ) | |
|   quantization_params( ) | |
|   segmentation_params( ) | |
|   tile_info( ) | |
|   header_size_in_bytes | f(16) |
| } | |

3. Proposed Semantics

As noted, frame_id_numbers_present_flag indicates whether frame ID values are present. The value of frame_id_numbers_present_flag is 1 if frame ID numbers are present, or 0 otherwise.

As noted, frame_id_repetition_prohibited_flag specifies whether repetitions of current_frame_id values are prohibited (except as necessary for the fixed-length representation of the current_frame_id values). When the value of this flag is equal to 1, the value of current_frame_id shall not be repeated within any series of $2^{frame\_id\_length\_minus7+7}$ consecutive frames in the bit stream in decoding order. When the value of the flag is equal to 0, this constraint does not apply.

Note: The maximum possible succession of frames without repetition is equal to $2^{frame\_id\_length\_minus7+7}$ frames. Prohibiting repetitions can provide a greater degree of loss robustness, but assuring this lack of repetitions may be difficult in some usage scenarios.

The use of a flag to indicate whether or not this restriction is applied provides flexibility for the encoder 304 in deciding how best to balance robustness on the one hand, and practical considerations on the other. The flag in the uncompressed or sequence header is an extremely efficient means of signalling this choice to the receiver 401.

Alternatively, the restriction on repetitions when the flag is 1 may be somewhat more relaxed. For example, rather than prohibiting all repetitions except as necessary for the fixed-length representation of the frame ID values, alternative approaches could be considered, such as using the flag only to prohibit repetitions within a series of 128 consecutive frames or within a series of some other number of consecutive frames that is less than $2^{frame\_id\_length\_minus7+7}$. A possible extension would be for the encoder 304 to generate and send an additional (or alternative) syntax element to the decoder 404 in the bit stream 210, to indicate the length of a period within which a repetition would be prohibited.

As noted, frame_id_length_minus7 specifies the length of the current_frame_id and previous_frame_id[i], with i∈{0, 1, 2}, and is equal to frame_id_length_minus7+7. The value of frame_id_length_minus7 is in the range of 0 to 8, inclusive. This allows for the frame ID length, which is equal to frame_id_length_minus7+7, to be in the range of 7 to 15, inclusive.

As noted, current_frame_id is a number that identifies the current frame and is decoded from the bit stream only if the frame_id_numbers_present_flag is equal to 1. The current_frame_id has frame_id_length_minus7+7 bits, where frame_id_length_minus7 is decoded from the sequence header. The logic that decides the values of the current_frame_id is decided by the encoder 304 or application layer. The focus of the present disclosure is not on the means of selecting this as such, but rather on the mechanism by which the selection is communicated from the transmitter 301 to the receiver 401 in a reliable and efficient manner. Nevertheless, it can be beneficial to impose the following constraints to ensure reliability and consistency:

The value of the current_frame_id should be different from the current_frame_id values that were sent for all previously decoded reference frames that should be currently held in the decoder's reference frame buffer 408—as noted, these slots are specified by the encoder 304 using the VP9 refresh_frame_flags syntax elements for the frames in question.

If frame_id_repetition_prohibited_flag is equal to 1, the value of current_frame_id shall not be repeated within any series of $2^{frame\_id\_length\_minus7+7}$ consecutive frames in the bit stream in decoding order, to comply with the protocol set out herein.

In some usage scenarios, the current_frame_id may, in practice, sometimes be used as a (modulo) frame counter in decoding order or output order or as a (modulo) temporal positioning indicator in units of some clock tick interval. However, this is not necessary for the proper functioning of this scheme, i.e. it is not necessary for the counter to increment by one (or some other amount) for each frame for the techniques disclosed herein to operate correctly. That is, current_frame_id can have any value (subject to any of the above contains, where applicable, such as the maximum possible succession of frames without repetition being equal to $2^{frame\_id\_length\_minus7+7}$ frames) and is not required to operate as a frame counter in decoding order.

The syntax element previous_frame_id[i], with i∈{0, 1, 2}, is included in the bit stream 201 for a current frame when the one or more (up to three) other frames have been used as references in inter-coding of the current frame. It is equal to the value that was sent as the current_frame_id for the frame at buffer position ref_frame_idx[i] —again, it is noted that the encoder 303 will have specified this buffer position (i.e. as one of the eight slots 410 of the decoder's frame buffer 408) when sending the reference frames using the refresh_frame_flags syntax element.

The intention is for the buffer indexes (i.e. ref_frame_idx [i]) to serve as the primary mechanism for identifying reference frames. The reference frame identifier (i.e. previous_frame_id[i]) is a secondary check to ensure that the frame stored at the buffer slot in question is the correct frame (which may not be the case if intermediate frames have been lost).

These syntax elements are present only when the frame_id_numbers_present_flag is equal to 1. The current frame may use up to 3 reference frames, each having frame_id_length_minus7+7 bits, where frame_id_length_minus7 is preferably decoded from the sequence header, or alternatively extracted from the uncompressed header 202U. The decoder 404 infers that an error or loss of data has occurred when a value of previous_frame_id[i] has a value that differs from the prescribed value.

Using a predetermined "zero-point offset" (i.e. seven) for the frame ID length indicator frame_id_length_minus7 allows identifiers to be chosen over a sensible range of values (seven to fifteen), with reduced overhead in the bit stream and only four bits are needed to indicate the length of the identifier(s) to which it relates.

Note: as will be readily apparent from table 2 above, in the suggested syntax, the previous_frame_id[i] values are not sent when intra_only is equal to 1. The intra_only syntax element is part of the VP9 codes, and is set equal to 1 to indicate that the frame is an intra-only frame; intra_only equal to 0 indicates that the frame is an inter frame. That is, previous_frame_id[i] values are only sent for inter-frames (i.e. frame having at least one inter-encoded portion) as only these frames have references in this sense.

Thus, these are sent only when some previous frame(s) have been sent that can be available to the decoding process. Although the current frame may not actually reference three different frames for its decoding process, the proposed semantics require all three of the values previous_frame_id [i] with i∈{0, 1, 2} to contain valid frame identifiers, so that the correspondence of the values to the values stored in the corresponding slots of the frame buffer can be easily checked by the decoder without needing to identify which of the frames are actually referred to in the decoding process. However, in other implementations this requirement may be relaxed or removed.

The frame identifiers current_frame_id and previous_frame_id[i] are preferably encoded directly as numeric values in the bit stream 210, in i.e. not as difference values relative to other frame identifiers in the bit stream 210. This makes them simpler to interpret.

The frame_id_length_minus7 syntax element allows decoder 404 to correctly extract the variable-length frame identifiers from the bit stream 210.

4. The Frame Recovery Process

In this section the recovery process for applications is discussed, without and with feedback channels. When no feedback channel is available, only the bit stream 210 itself can be used for loss detection, so that the decoder 404 can identify frames that cannot be decoded properly and can perform frame dropping or loss concealment to cope with the problem. The decoder 404 may simply need to continue dropping frames or concealing frames until reaching some point in the bit stream when recovery is possible (e.g., by the encoder 304 including a "random access point" in the bit stream 210, such as an IDR-frame (or more generally an I-frame) at a random point in time in the bit stream 210). When a feedback channel is available, the decoder 404 would not only be able to detect a loss, but would also be able to provide a signal back to the encoder 304 via the feedback channel to facilitate rapid recovery from the detected loss.

4.1 Applications without Feedback Channels

In applications without feedback channels, the decoder 404 uses the current_frame_id and the reference frame IDs to verify that the buffer indices refer to valid reference frames. When a new frame arrives, the decoder 404 checks if the frame can be correctly decoded, i.e. if the reference frame ID values for the current frame match the values that were previously sent as the current_frame_id for the corresponding frames that are available in the reference frame buffer (as indicated by ref_frame_idx[i] for the current frame).

If they are available, the decoder 404 proceeds to decode the current frame. If any of the needed reference frames is missing, the decoder 404 may drop the current frame as not decodable, and wait for a new frame. Alternatively, the decoder 404 may perform some loss concealment operation when a loss is detected, such as substituting the content of some other recently received frame for the content of the frame that has been detected to be missing. The exact method of how the receiving system should respond when a data loss is detected can be left to the discretion of the implementers of the receiving system 401, and the decoder 404 in particular.

In this mechanism, the receiving system 401 can detect the loss, although it cannot inform the sender because there is no feedback channel in use. In cases where the data loss has a severe impact, such as when a long string of frames has been decoded that all depend (directly or indirectly) on some data that has not been properly received, the decoder may either simply continue to drop all frames until a full "random access" refresh point is detected in the bit stream or may perform some loss concealment scheme to attempt to decode an approximation of the decoded pictures.

4.2 Applications with Feedback Channels

In applications with feedback channels, the decoder 404 also uses the current_frame_id and the reference frame IDs to verify that the buffer indices refer to valid reference frames. When a new frame arrives, the decoder 404 checks if the frame can be correctly decoded, i.e. if the reference frames for the current frame are available in the reference frame buffer, as described above in section 3.1. If they are available, the decoder proceeds to decode the current frame.

However, if any of the needed reference frames is missing, the receiver 401 may choose to inform the sender 301 immediately, with delay, or may ignore the loss.

The receiver 401 may for example use RTP feedback signalling to let the sender know that loss has occurred. Based on this information, the sender 301 may control the encoder 304 not to use some frames as references for encoding as they are not safe. Further, the encoder 304 encodes the next frame, and all frames after that, using only frames that are considered safe to be used as references (i.e. not those identified as lost by the receiver 401).

4.3 Alignment with RTP

An example of a feedback channel that can be used by the decoder 404 signal if a frame was lost is an RTP (real-time transport protocol) feedback channel. In this section an implementation of the AV1 video codec with RTP feedback is described in more detail.

In this example, the decoder 404 maintains a frame counter for each of the eight reference frame slots in the frame buffer 408 and keeps track of their values. The decoder 404 maintains uses two counters:

a frame counter, to keep track of the current frame (frame_counter), and a closes reference frame counter, to keep track of the most recent successfully received reference frame (closest_ref_frame_counter) relative to the current frame, i.e. relative to frame_counter to verify that the buffer indices refer to valid reference frames.

When a new frame arrives, the decoder checks if the frame can be correctly decoded, i.e. every ref_frame_idx[i] has a frame counter≤closest_ref_frame_counter.

To use the solution in this document with the above concept, the transmitter 301 and receiver 401 can be configured such that:

At an application level, the decoder 404 assumes current_frame_id functions as a frame counter that increases for every decoded frame, which resets only when it wraps around i.e., does not reset on key frames (unless a key-frame happens to coincide with a wrap-around). The encoder 304 needs to make sure that this frame counter is incremented for every frame accordingly.

At the encoder 304, a mapping of the reference frame IDs to the actual frame counters corresponding to the reference frames is maintained, in order to determine a closest_ref_frame_counter at the encoder 304. Alternatively, the receiver 401 can send all of its current frame counters to the encoder 304 in Picture Loss Information (PLI) that is fed-back via the feedback channel.

The decoder 404 determines the closest_ref_frame_counter to the current frame using previous_frame_id [i], where i∈{0, 1, 2}.

Recovery processes based on frame counters are known in the art, and it will be apparent to the skilled how such recovery processes can be implemented in this context.

A distinction with respect to such recovery processes is that the frame_counter and closest_ref_frame_counter are inferred from the syntax elements current_frame_id, previous_frame_id[i], with i∈{0, 1, 2} signalled within the bit stream 210 itself.

These syntax elements from which the counters are inferred are decoded from the bit stream 210 instead of being signalled outside the codec. The resulting solution is container independent and reduces the overhead and code complexity of the RTP stack.

Another distinction is the use of the refresh_frame_flags and ref_frame_idx[i] syntax elements in conjunction with these inferred frame counters, as described below.

The counters are inferred taking into account the fact that the current_frame_id and previous_frame_id[i] re-sets to once their values have reached $2^{frame\_id\_length\_minus7+7}$.

EXAMPLE

An example of this scheme will now be described, with reference to FIG. 6, to illustrate possible use cases and feedback signals.

Figure 6:
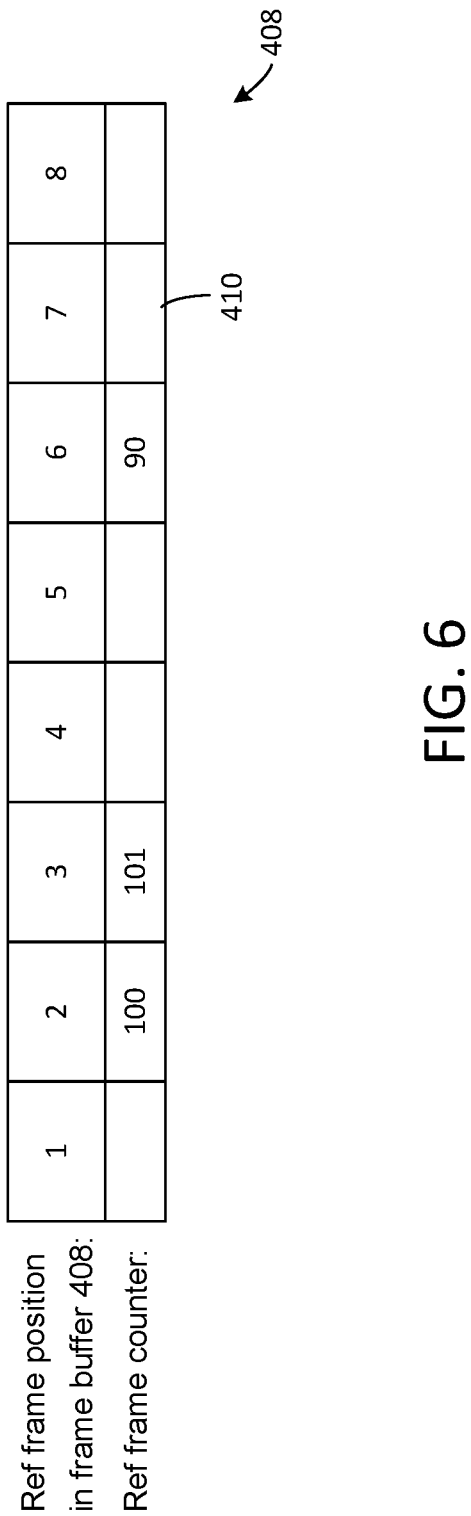
FIG. 6 shown one example of data stored in a frame buffer at a receiving device.

FIG. 6 show the (in this case eight) reference frame slots 410 of the frame buffer 408, each of which comprises a corresponding reference frame counter. In this example, three buffer slots (2, 3, and 6) are occupied with the reference frames 100, 101, 90 (those being the reference frame counter values, corresponding the current_frame_id for those reference frames).

Suppose that, say, frame 110 is lost. In the case of partial frame loss, the receiver 401 may take immediate action in order to allow for a short recovery time. In the case of full frame loss, the receiver may ignore the loss or delay the action.

i. Partial Loss of Frame 110

The receiver 401 may detect a partial loss of frame 110 because it receives some packets from frame 110 and starts receiving packets from the next frame 111. This is an indication that either there is packet loss or reordering in the network. To enable a fast recovery, the receiver may communicate this to the transmitter 301, for instance by sending the Picture Loss Information (PLI) to the transmitter 301 immediately. PLI contains information about the last known good frame at the decoder (101) and the current frame at the decoder CFD (110).

Then, ref_frame_idx[i]=1, 2, 6 (according to the position in the buffer), i.e. the reference frames are located at positions 1, 2, and 6 in the reference frame buffer, which contains a total of eight positions/slots 1, 2, 3, ... 8 and one reference frame in each slot. Using previous_frame_id[0], previous_frame_id[1], previous_frame_id[2] it is possible to determine that the closest_ref_frame_counter=101. Since the current frame at the decoder is 110 and the last known good frame was 101, the frames in the range 102-110 are invalidated as they are not safe to decode.

At the encoder 304, the next frame is encoded with respect to the closest reference frame (101) available to the decoder 404, i.e. the encoder can use any reference frames from its buffer that has a frame counter≤closest_ref_frame_counter.

An additional rule at the encoder that is helpful to resolve the reference frame usage. Specifically, when the encoder 304 at frame X is instructed by the application layer to use reference frames (N, . . . , M), the encoder 304 shall never use any frame older than X and that is not in the set (N, . . . , M). In the example discussed earlier, once the encoder 304 at the next frame (after the loss) is forced not to use frame 110 as a reference, the encoder should not use frame 110 as a reference for the subsequent frames. This application layer restriction would simplify the syntax to only signal the closest reference frame instead of the entire reference frame set if this syntax element were included in the bit stream. With the proposed solution that sends the frame IDs for all the reference frames of the current frame, this application layer restriction may not be strictly necessary although it can be a helpful guidance for the encoder 303 to not use reference frames that the decoder 404 does not have, particularly as the decoder 404 may simply drop frames that do use such frames as references.

B) Total Loss of Frame 110

In this case, the receiver 401 may detect a total loss of frame 110 only if the next frame uses frame 110 as a reference. Otherwise the receiver 401 ignores the loss and decoding continues without frame 110.

If the next frame uses frame 110 as a reference, the receiver can drop the frame (which is not decodable without the reference frame 110 that was lost) and inform the sender by sending a PLI. The same recovery mechanism as in Case A) follows in that event.

5. Relationship with the RTP Payload Format

A subgroup of the AOM applications—real-time application in particular, such as VoIP calling—are expected to use RTP along with the AOM video codec. Such applications will need to comply with any RTP payload format specification for AOM. At the time of writing, this is still in development but will likely will be based on the draft RTP payload format for VP9 [RTP Payload Format for VP9 Video—J. Uberti, S. Holmer, M. Flodman, J. Lennox, D. Hong, draft-ietf-payload-vp9-02, Mar. 18, 2016 available at https://tools.ietf.org/html/draft-ietf-payload-vp9-20] (the "VP9 RTP Specification").

This sets out how VP9 data can be included in the payload of an RTP packet (RTP payload). RTP is a well-established network protocol for streaming audio and video over IP network, and further details of RTP are not described herein.

The relationship between the present proposal and the envisaged AOM RTP payload format specification is discussed, for the scenarios of sections 4.2 and 4.3 and above.

The proposed solution for the AV1 video codec is general and applicable to a wide range of scenarios (both real-time and higher delay). The solutions proposed in the RTP payload format specification are intended to be more restrictive and specify additional constraints for real-time encoding, unicast operation with feedback channels. As such, the AV1 video codec specification and a potential RTP payload format specification for AV1 are complementary for this subgroup of applications. For the rest of the AOM applications, only the AV1 video codec specification is expected to be relevant.

According to the VP9 RTP Specification, the first octets of the RTP payload embody a VP9 payload descriptor, which can include a picture ID (PID) at a specific location in the payload descriptor.

In some RTP implementations, the PID field can be used to hold the current_frame_id of the present disclosure.

This is possible because the PID and the proposed current_frame_id have similar properties: both have minimum 7 and maximum 15 bits, their values are decided by the application layer, and wrap around after reaching the maximum values.

In some cases, a requirement may be imposed that the PID field in the payload descriptor of the VP9 RTP Specification must function as a frame counter. For example, this may be suitable when implementing the techniques of section 4.3 above.

However, note that the proposed current_frame_id is more general in that it allows any values between 7 and 15 bits as well and other applications that are outside of the subgroup mentioned earlier will be able to use the current_frame_id without restricting it to function as a frame counter.

It is expected that an RTP payload specification for AV1 will also refine two other areas: the signalling of the reference frame indices and the usage of the reference picture selection indication (RPSI) and slice loss indication (SLI) feedback signals. Currently the draft VP9 RTP Specification signals that either 0 or up to 3 reference indices may be specified using the reference index P_DIFF. This index has 7 bits and is specified as a relative PID to the current frame.

By contrast, the present disclosure proposes sending explicit reference frame IDs in the bit stream that may have 7 to 15 bits. Doing so provides full information for the reference frame IDs.

Lastly, the draft VP9 RTP Specification includes four feedback messages, of which the reference picture selection indication (RPSI) and slice loss indication (SLI) are relevant for this discussion. The RPSI is intended as either negative feedback to the sender that a reference picture loss was detected, or positive feedback to acknowledge correct reception of reference pictures. The SLI message is sent by the receiver when a loss or corruption is detected in a frame. The format of the SLI includes a PictureID field, which contains the least significant 6 bits of the PID of the current frame, as read from the payload descriptor. In principle, VoIP and other real-time applications can use the RPSI and SLI signals (if they will be available for AV1) for scenarios in sections 4.2 and 4.3.

To summarize, the present disclosure provides proposed syntax and semantics additions to the AV1 video codec specification to provide support for loss detection and recovery using non-IDR frames. The present proposal has wide applicability as it can for example:

Work with a variety of different applications with or without feedback signalling Provide loss detection in all applications Provide fast recovery in applications with feedback signalling With minimal changes existing VoIP applications can use its current implementation for recovery with non-IDR frames in combination with the present proposal. Last but not least, while the proposed changes provide a general solution for AOM applications, additional constraints may be provided via an RTP payload format specification to increase the efficiency of real-time scenarios with feedback channels.

Note that, there are possible variations of the proposed solution that may be beneficial for other applications. For instance, instead of sending the frame ID values for the three previous frame IDs, sending the frame IDs for all of the positions (currently eight) in the reference frame buffer. The overhead in this case would consist of 6 bits in the sequence header plus 72 . . . 144 bits in the uncompressed frame header. This variation of the solution could potentially be useful for some random access applications, especially for trick mode (trick play) functionality, although at the cost of relatively significant overhead.

As noted above, whilst the terms non-I-frame and inter-frame are sometimes used synonymously, there can be subtle distinction in some contexts: in the language of a typical video coding spec, an "I frame" would be a frame that is indicated in high-level syntax that it is guaranteed not to use inter prediction (and thus at a finer level of granularity, such as at the "superblock"/"macroblock" or "coding unit" level there is no need to indicate whether the region uses inter prediction or not). A "non-I frame" would be a frame that is indicated in high-level syntax that it might use inter prediction (along with some indication or implicit understanding established about which other frames are used as reference frames), and thus at a finer level of granularity such as at the "superblock"/"macroblock"/"coding unit" level there is an indication of whether intra or inter prediction is used (or whether no prediction is used at all). It is hypothetically possible (although likely rare in practice) to have a non-I frame in this context, in which none of the lower-level syntax actually selects the use of inter prediction.

As another subtle point, the high-level syntax that indicates the overall property may be at a level lower than the frame level. For example, in H.264 and HEVC, the high-level indication of intra versus inter is ordinarily at the slice level, not the whole-frame level. So although it is common for those skilled in the art to refer to I frames and non-I frames (or "predictive frames" or "bipredictive frames" or such), at least some standards do not actually use those terms. In the current VP9 design, tiles are supported but not slices, and the indication is at the frame level. In HEVC, both tiles and slices are found, and the indication is at the slice level. Hypothetically, the indication could be at the tile level rather than the slice or frame level.

Generally, any of the functions described herein can be implemented using software, firmware, hardware (e.g., fixed logic circuitry), or a combination of these implementations. The encoder 304 and decoder 404 generally represent software, firmware, hardware, or a combination thereof capable of performing video encoding and decoding operations respectively. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors. For example, the transmitting and/or receiving device 301, 401 can include an entity (e.g. software) that causes hardware of the device to perform operations, e.g., processors, functional blocks, and so on. For example, the devices may include a computer-readable medium that may be configured to maintain instructions that cause the devices, and more particularly the operating system and associated hardware of the devices to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device comprising:

a processor; and a memory in communication with the processor, the memory comprising executable instructions that, when executed by the processor, cause the processor to control the device to perform functions of:

receiving, via a communication network, an encoded first frame of video data and a first frame description for the first frame, the first frame description comprising (1) a first frame identifier of the first frame and (2) an indicator of a storage location at the device at which the first frame and the first frame identifier are to be stored;

decoding the first frame;

storing the first frame and the first frame identifier at the storage location indicated in the first frame description;

receiving, via the communication network, an encoded second frame of the video data and a reference frame description for the second frame, the reference frame description comprising (1) a reference frame identifier of a reference frame for the second frame and (2) an indicator of the storage location at which the reference frame is stored;

accessing, based on the indicator in the reference frame description, the first frame identifier stored at the storage location;

comparing the first frame identifier with the reference frame identifier;

determining that the first frame identifier matches the reference frame identifier; and decoding, using the first frame as the reference frame for inter-frame decoding, the second frame.

2. The device of claim 1, wherein the instructions, when executed by the processor, further cause the processor to control the device to perform a function of receiving, via the communication network, a frame ID length indicator that identifies a length of the first frame identifier.

3. The device of claim 2, wherein the instructions, when executed by the processor, further cause the processor to control the device to perform a function of extracting, based on the frame ID length indicator, the first frame identifier from the first frame description.

4. The device of claim 2, wherein the first frame identifier has a length equal to a sum of the frame length ID indicator and a predetermined constant.

5. The device of claim 2, wherein the instructions, when executed by the processor, further cause the processor to control the device to perform a function of receiving, via the communication network, a sequence description of the video data, the sequence description comprising the frame ID length indicator and pertaining to multiple frame descriptions received for a sequence of encoded frames of the video data, each of the multiple frame descriptions comprising a frame identifier and a length of the frame identifier.

6. The device of claim 5, wherein the instructions, when executed by the processor, further cause the processor to control the device to perform a functions of receiving, via the communication network, a superframe including the sequence description and the multiple frame descriptions, the superframe comprising the sequence of encoded video frames, in which the sequence description is carried in a superframe syntax structure of the superframe and the frame descriptions are conveyed in frame header data associated with each encoded video frame.

7. The device of claim 1, wherein the instructions, when executed by the processor, further cause the processor to control the device to perform a function of receiving, via the communication network, a frame ID present flag indicating a presence of the first frame identifier in the first frame description.

8. The device of claim 1, wherein the instructions, when executed by the processor, cause the processor to control the device to perform a function of receiving, via the communication network, an encoded bit stream comprising the first frame and the first frame description, the first frame description forming header data of the encoded bit stream.

9. The device of claim 8, wherein the first frame identifier is included in an uncompressed portion of the header data.

10. The device of claim 8, wherein the indicator of the storage location in the first frame description conforms to the VP9 Specification.

11. The device of claim 1, wherein the encoded video data is received, via the communication network, from a transmitting device.

12. A method of operating a device, comprising:

receiving, via a communication network, an encoded first frame of video data and a first frame description for the first frame, the first frame description comprising (1) a first frame identifier of the first frame and (2) an indicator of a storage location at the device at which the first frame and the first frame identifier are to be stored;

decoding the first frame;

storing the first frame and the first frame identifier at the storage location indicated in the first frame description;

receiving, via the communication network, an encoded second frame of the video data and a reference frame description for the second frame, the reference frame description comprising (1) a reference frame identifier of a reference frame for the second frame and (2) an indicator of the storage location at which the reference frame is stored;

accessing, based on the indicator in the reference frame description, the first frame identifier stored at the storage location;

comparing the first frame identifier with the reference frame identifier;

determining that the first frame identifier matches the reference frame identifier; and decoding, using the first frame as the reference frame for inter-frame decoding, the second frame.

13. The method of claim 12, further comprising receiving, via the communication network, a frame ID length indicator that identifies a length of the first frame identifier.

14. The method of claim 13, further comprising extracting, based on the frame ID length indicator, the first frame identifier from the first frame description.

15. The method of claim 13, wherein the first frame identifier has a length equal to a sum of the frame length ID indicator and a predetermined constant.

16. The method of claim 12, further comprising receiving, via the communication network, a frame ID present flag indicating a presence of the first frame identifier in the first frame description.

17. The method of claim 12, further comprising receiving, via the communication network, an encoded bit stream comprising the first frame and the first frame description, the first frame description forming header data of the encoded bit stream.

18. The method of claim 17, wherein the first frame identifier is included in an uncompressed portion of the header data.

19. The method of claim 17, wherein the indicator of the storage location in the first frame description conforms to the VP9 Specification.

20. A non-transitory computer readable medium containing instructions which, when executed by a processor, cause a device to perform functions of:

receiving, via a communication network, an encoded first frame of video data and a first frame description for the first frame, the first frame description comprising (1) a first frame identifier of the first frame and (2) an indicator of a storage location at the device at which the first frame and the first frame identifier are to be stored;

decoding the first frame;

storing the first frame and the first frame identifier at the storage location indicated in the first frame description;

receiving, via the communication network, an encoded second frame of the video data and a reference frame description for the second frame, the reference frame description comprising (1) a reference frame identifier of a reference frame for the second frame and (2) an indicator of the storage location at which the reference frame is stored;

accessing, based on the indicator in the reference frame description, the first frame identifier stored at the storage location;

comparing the first frame identifier with the reference frame identifier;
determining that the first frame identifier matches the reference frame identifier; and
decoding, using the first frame as the reference frame for inter-frame decoding, the second frame.

\* \* \* \* \*